(12) United States Patent
Hoshi et al.

(10) Patent No.: US 8,356,627 B2
(45) Date of Patent: Jan. 22, 2013

(54) THREE-VALVES MANIFOLD FOR DIFFERENTIAL PRESSURE TYPE FLOW METER

(75) Inventors: Kaname Hoshi, Tokyo (JP); Chikara Kanda, Tokyo (JP)

(73) Assignee: Tokyo Keiso Co., Ltd., Tokyo (JP)

( * ) Notice: Subject to any disclaimer, the term of this patent is extended or adjusted under 35 U.S.C. 154(b) by 804 days.

(21) Appl. No.: 12/507,956

(22) Filed: Jul. 23, 2009

(65) Prior Publication Data

US 2011/0017325 A1    Jan. 27, 2011

(51) Int. Cl.
*E03B 7/07* (2006.01)
*F17D 3/18* (2006.01)
*F16K 11/085* (2006.01)
*F16K 11/14* (2006.01)
*F16K 35/14* (2006.01)
*G01L 7/08* (2006.01)

(52) U.S. Cl. .......... 137/597; 137/557; 137/595; 73/756; 73/861.56

(58) Field of Classification Search ............. 137/595, 137/557, 597, 864, 625, 625.18, 625.19, 137/637.1, 637.3; 73/861.56, 756

See application file for complete search history.

(56) References Cited

U.S. PATENT DOCUMENTS

| | | | | |
|---|---|---|---|---|
| 3,450,157 A | * | 6/1969 | Hewson | 137/595 |
| 3,596,680 A | * | 8/1971 | Adams | 137/637 |
| 3,894,559 A | * | 7/1975 | DePuy | 137/595 |
| 4,602,657 A | * | 7/1986 | Anderson et al. | 137/595 |
| 4,716,923 A | * | 1/1988 | West | 137/312 |
| 4,977,917 A | * | 12/1990 | Adams | 137/597 |
| 5,117,867 A | * | 6/1992 | Adams | 137/577 |
| 5,417,243 A | * | 5/1995 | Ragona | 137/625.19 |
| 5,482,081 A | * | 1/1996 | Adams | 137/597 |
| 6,035,724 A | * | 3/2000 | Hewson | 73/756 |
| 6,415,819 B1 | * | 7/2002 | Pas et al. | 137/597 |

* cited by examiner

*Primary Examiner* — John Rivell
*Assistant Examiner* — Atif Chaudry
(74) *Attorney, Agent, or Firm* — Holtz, Holtz, Goodman & Chick, PC

(57) ABSTRACT

A three-valves manifold for a differential pressure type flow meter includes a valve unit and a housing. The valve unit includes a shaft portion, a first valve portion having a first through hole and first to third grooves and a second valve portion having a second through hole and fourth and fifth grooves. The housing includes a space in which the shaft portion and valve portions are rotatably arranged. The first and second through holes and first to fifth grooves are formed at positions such that the first and second through holes communicate differently with first and second inlet and outlet openings of the housing in each of first, second, and third rotational positions.

5 Claims, 4 Drawing Sheets

THREE-VALVES MANIFOLD FOR DIFFERENTIAL PRESSURE TYPE FLOW METER

BACKGROUND OF THE INVENTION

1. Field of the Invention

The present invention relates to a three-valves manifold for use in a differential pressure type flow meter for introducing a differential pressure to a differential pressure oscillator.

2. Related Art Statements

In case of measuring a flow rate by using a differential pressure type flow meter, as illustrated in FIG. 4, an orifice 2 is arranged within a main conduit 1 through which a fluid whose flow rate is to be measured flows, and one ends of pressure guide pipes 4a and 4b are connected to the main conduit 1 at downstream and upstream positions, respectively with respect to the orifice 2. The other ends of the pressure guide pipes 4a and 4b are coupled with a differential pressure transducer 5. Since the differential pressure transducer 5 generates a signal representing a differential pressure, the differential pressure transducer 5 is also called a differential pressure signal generator in the present specification.

The pressure guide pipes 4a and 4b are communicated with each other by means of a connecting pipe 7. In the pressure guide pipes 4a and 4b and connecting pipe 7 there are arranged valves 6a, 6b and 6c, respectively. The above mentioned pressure guide pipes 4a, 4b and connecting pipe 7 and the valves 6a, 6b and 6c are constructed as a single unit named a three-valves manifold.

Upon measuring a flow rate of the fluid flowing through the main conduit 1, the valves 6a and 6b are opened and the valve 6c is closed to introduce a pressure of the main conduit 1 at the upstream position with respect to the orifice 2 as well as a pressure of the main conduit 1 at the downstream position with respect to the orifice 2 to both sides of a pressure sensitive member of the differential pressure signal generator 5. In this manner, a differential pressure is applied to the differential pressure signal generator 5 to generate a signal representing a flow rate of the fluid passing through the main conduit 1. Upon adjusting a zero point of the differential pressure signal generator 5, the valve 6c is opened and both the valves 6a and 6b are closed such that a pressure at one side of the pressure sensitive member of the differential pressure signal generator 5 becomes identical with a pressure at the other side of the pressure sensitive member of the differential pressure signal generator 5.

When the differential pressure type flow meter is used initially or is used again after a rather long intermission, it is important to operate the valves 6a-6c carefully such that an excessively high pressure is not applied to only one side of the pressure sensitive member of the differential pressure signal generator 5. To this end, one of the valves 6a and 6b is opened and the valve 6c is opened. After that, the other of the valves 6a and 6b is opened and the valve 6c is closed to initiate a measurement of a flow rate.

In this manner, during the measurement, at the time of initial use and at the time of use after long intermission, the three valves 6a-6c are opened and closed in accordance with a predetermined manner. If the valves 6a-6c are erroneously operated, a pressure of the fluid flowing through the main conduit 1 might be applied to only one side of the pressure sensitive member of the differential pressure signal generator 5 and the differential pressure signal generator 5 might be broken. Furthermore, a sealing liquid contained within the pressure guide pipes 4a and 4b might be introduced into the main conduit 1. The above mentioned problems also occur in the three-valves manifold in which the pressure guide pipes 4a and 4b and the three valves 6a-6c are formed as a single unit.

SUMMARY OF THE INVENTION

The present invention has for its object to provide a novel and useful three-valves manifold for use in a differential pressure type flow meter, which can solve the above mentioned problems and in which three valves can be operated in a correct manner without failure.

According to the invention, a three-valves manifold for a differential pressure type flow meter comprises a valve unit including a shaft portion and first and second valve portions provided on the shaft portion separated from each other along a longitudinal direction of the shaft portion, each of said first and second valve portions having a circular cross section; and a housing having a cylindrical space within which a substantial part of said shaft portion and said first and second valve portions are installed rotatably, said housing having formed therein first and second inlet openings to be communicated with a main conduit at upstream and downstream positions, respectively with respect to an orifice arranged within the main conduit through which a fluid whose flow rate is to be measured, and first and second outlet openings to be communicated with respective sides of a pressure sensitive member of a differential pressure signal generator, said first inlet and outlet openings being diametrically opposed to each other and said second inlet and outlet openings being diametrically opposed to each other; whereby said first valve portion has a first central through hole formed within the first valve portion and first, second and third grooves formed in an outer surface of the first valve portion and said second valve portion has a second through hole formed within the second valve portion and fourth and fifth grooves formed in an outer surface of the second valve portion, inner ends of said first to fifth grooves are opened to the cylindrical space of the housing; said valve unit is rotated into first, second and third rotational positions; in said first rotational position, said first central through hole of the first valve portion is communicated with said first inlet and outlet openings and said second central through hole of the second valve portion is communicated with said second inlet and outlet openings; in the second rotational position, said first and second grooves of the first valve portion are communicated with said first inlet and outlet openings, respectively and at the same time said fourth groove of the second valve portion is communicated with said second outlet opening; and in said third rotational position, said third groove of the first valve portion is communicated with the first outlet opening and said fifth groove off the second valve portion is communicated with said second outlet opening.

In the three-valves manifold for a differential pressure type flow meter, in said first rotational position, pressures in the main conduit at upstream and downstream positions with respect to the orifice are applied to respective sides of the pressure sensitive member of the differential pressure signal generator to measure a flow rate of the fluid passing through the main conduit, in said second rotational position, a pressure in the main conduit at one of said upstream and downstream positions is applied to both sides of the pressure sensitive member, and in said third rotational position, both sides of the pressure sensitive member are isolated from the main conduit and are communicated with each other to perform a zero point adjustment. When the differential pressure type flow meter is used for the first time or is used again after a relatively long rest time period, the differential pressure type flow meter is advantageously driven into said second rotational position. In any one of said first to third rotational positions, an excessive large pressure could never be applied to only one side of the pressure sensitive member of the differential pressure signal generator.

Moreover, a user can operate safely the three-valves manifold according to the invention without a special care and the differential pressure signal generator can be effectively protected against an excessive large pressure and can be isolated from a high temperature fluid or corrosive fluid. Furthermore, undesired leakage of a sealing liquid from pressure guide pipes connected to the inlet and outlet openings of the housing can be prevented

DESCRIPTION OF THE PREFERRED EMBODIMENTS

Now the present invention will be explained in detail with reference to an embodiment of the three-valves manifold for a differential pressure type flow meter according to the invention shown in FIGS. 1-3.

Figure 1:
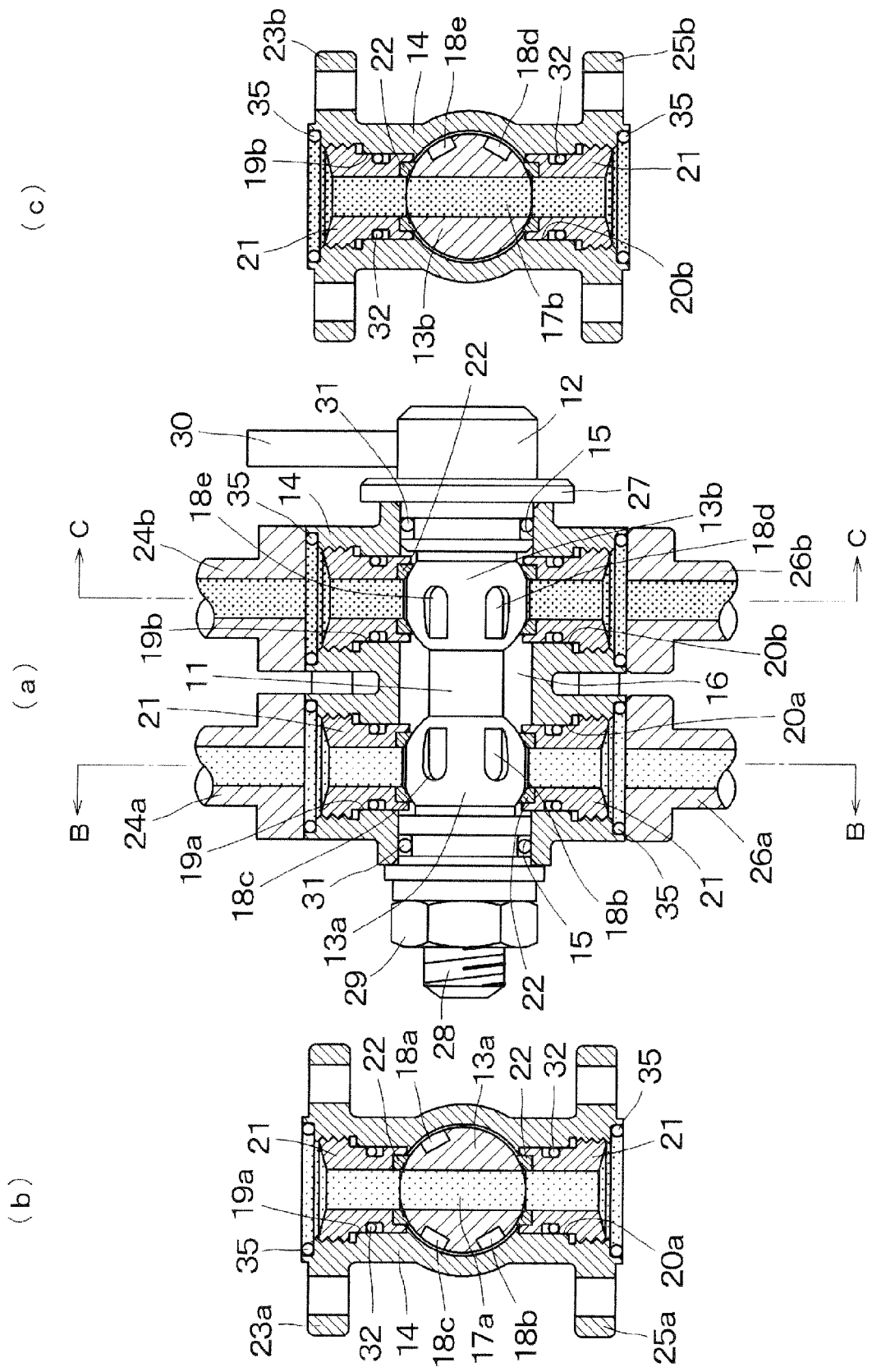
FIGS. 1(a)-1(c) are cross sectional views showing a first rotating operative condition of the three-valves manifold according to the invention.
Figure 2:
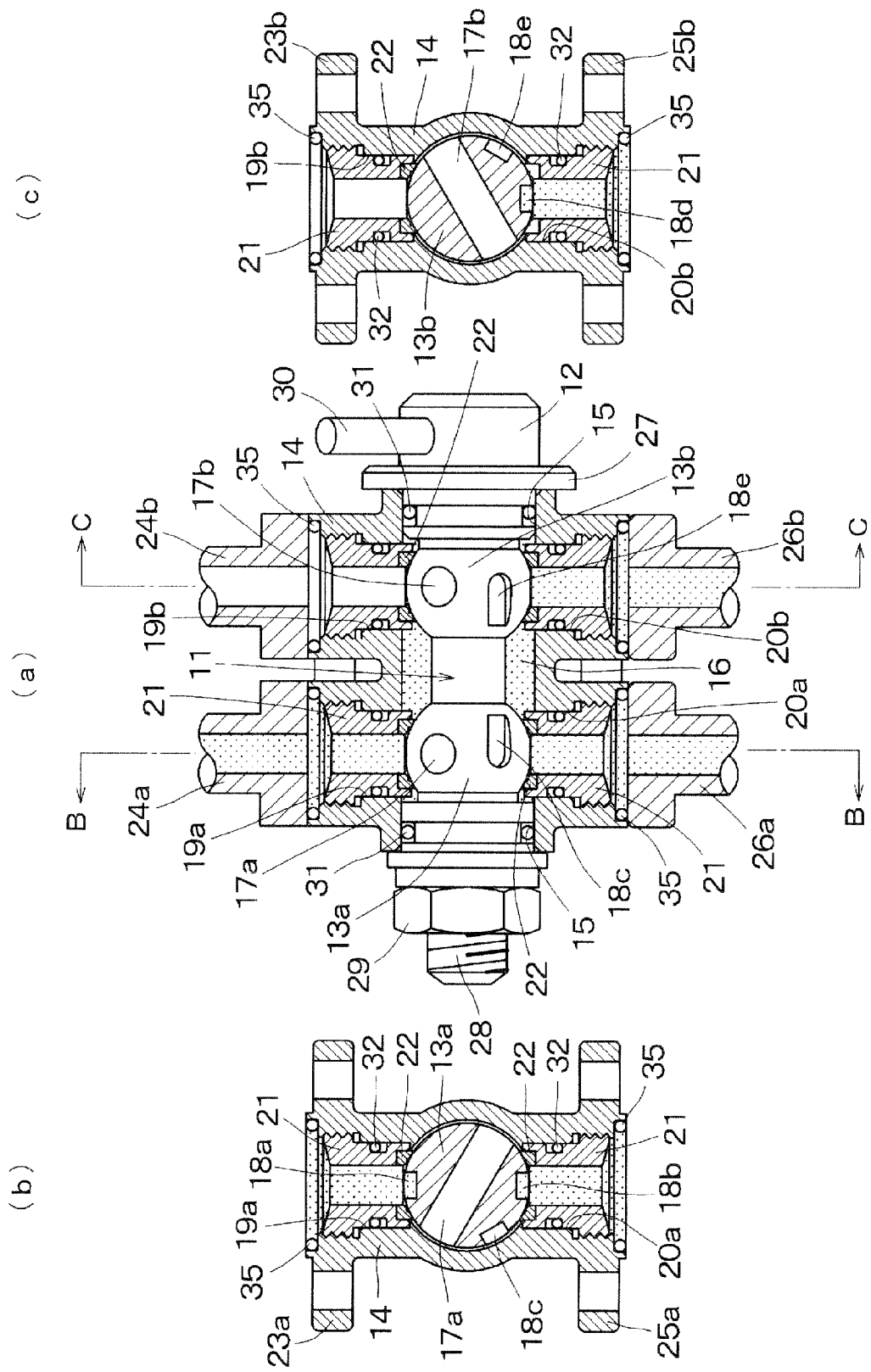
FIGS. 2(a)-2(c) are cross sectional views illustrating a second rotating operative condition of the three-valves manifold according to the invention.
Figure 3:
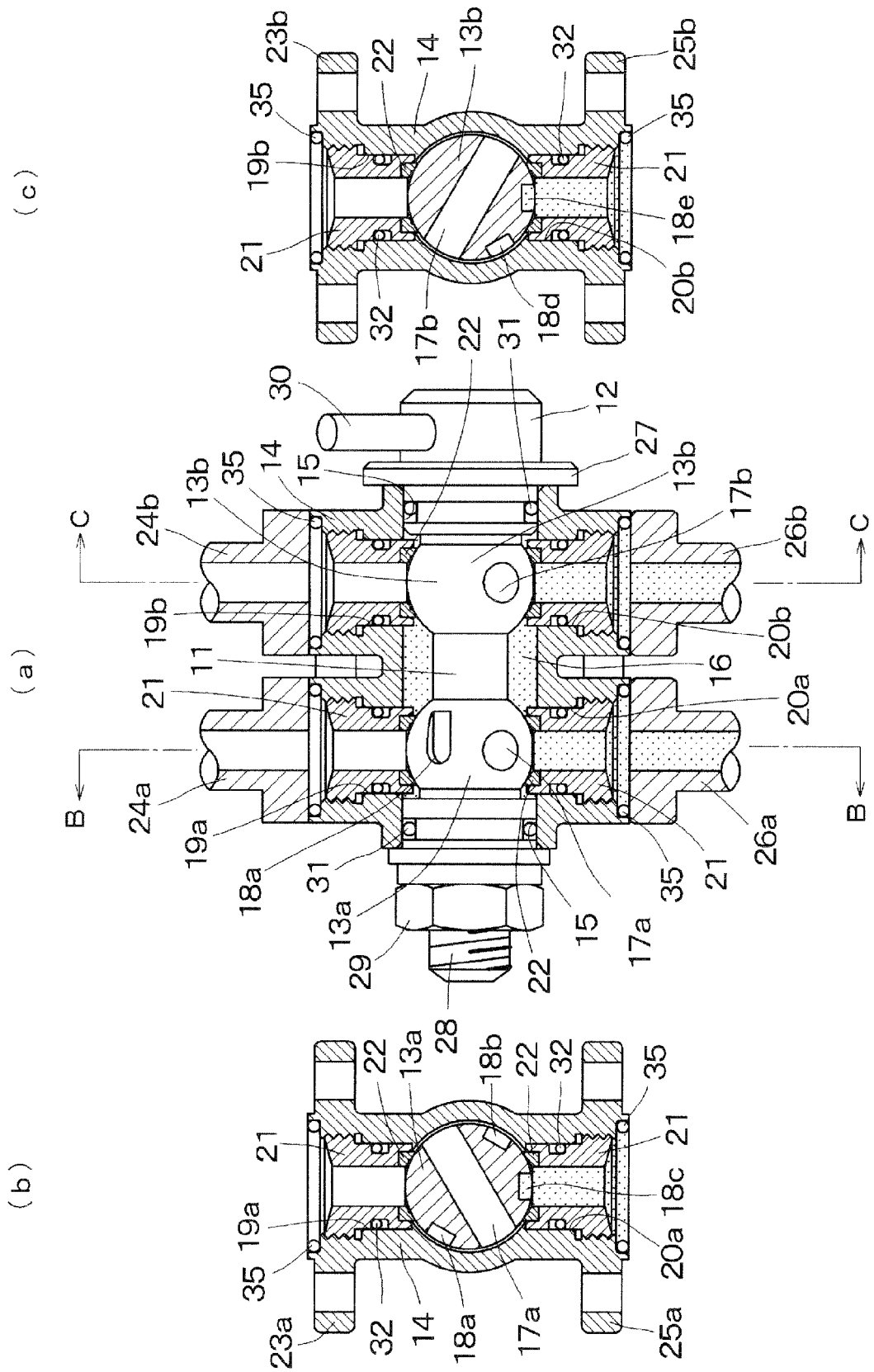
FIGS. 3(a)-3(c) are cross sectional views depicting a third rotating operative condition of the three-valves manifold according to the invention.
Figure 4:
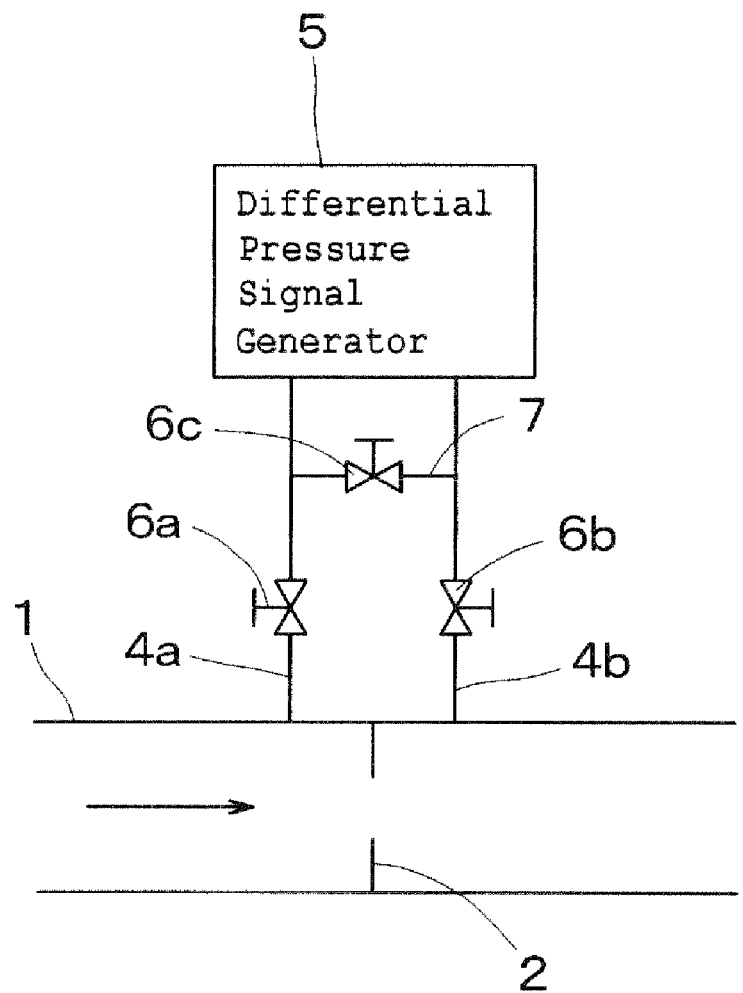
FIG. 4 is a schematic diagram representing a differential pressure type flow meter including a known three-valves manifold.

FIGS. 1-3 are cross sectional views showing an embodiment of the three-valves manifold according to the invention in three operative conditions. FIGS. 1 (a)-3(a) are longitudinal cross sections, FIGS. 1(b)-3(b) are lateral cross sections cut along lines B-B shown in FIGS. 1(a)-3(a), and FIGS. 1(c)-3(c) are lateral across sections cut along lines C-C illustrated in FIGS. 1(a)-3(a).

The three-valves manifold according to the invention comprises a valve unit 11 and a housing 14. The valve unit 11 includes a shaft portion 12 and first and second valve portions 13a and 13b arranged separately over a given distance along the shaft portion 12. In the present embodiment, each of the first and second valve portions 13a and 13b is formed into a substantially spherical shape. It should be noted that in the longitudinal cross sectional view of FIG. 1(a), the valve unit 11 and valve portions 13a, 13b are shown without cutting them. The valve unit 11 is arranged within the housing 14 having formed therein journal portions 15 for supporting the shaft portion 12 rotatably and a cylindrical space 16 for accommodating a substantial part of the shaft portion 12 and the first and second valve portions 13 and 13b.

The first valve portion 13a has a first central through hole 17a formed within a bulk of the first valve portion 13a and first, second and third grooves 18a, 18b and 18c formed in an outer surface of the first valve portion 13a. The second valve portion 13b has a second central through hole 17b formed within a bulk of the second valve portion 13b and fourth and fifth grooves 18d and 18e formed in an outer surface of the second valve portion 13b.

As illustrated in FIGS. 1(b) and 1(c), the first central through hole 17a formed in the first valve portion 13a is in parallel with the second central through hole 17b formed in the second valve portion 13b. The first and second grooves 18a and 18b formed in the outer surface of the first valve portion 13a are diametrically opposed to each other and the third groove 18c is formed between the second groove 18b and an upper outlet of the first central through hole 17a. The second groove 18b formed in the first valve portion 13a is aligned with the fourth groove 18d formed in the second valve portion 13b viewed in a longitudinal direction of the valve unit 11, and the first groove 18a formed in the first valve portion 13a and fifth groove 18e formed in the second valve portion 13b are longitudinally aligned with each other.

Each of the first to fifth grooves 18a-18e is formed to have a small depth and a width slightly smaller than a diameter of the first and second central through holes 17a and 17b. Each of the grooves 18a-18c formed in the first valve portion 13a extends in the longitudinal direction of the valve unit 11 from a point which is slightly deviated in a left-hand side direction viewed in the cross section of FIG. 1(a) from a lateral plane passing through a center of the first central through hole 17a and being perpendicular to the longitudinal direction as well as the cross section of FIG. 1(a). Each of the grooves 18d and 18e formed in the second valve portion 13b extends in the longitudinal direction of the valve unit 11 from a point which is slightly deviated in a right-hand side direction viewed in the cross section of FIG. 1(a) from a lateral plane passing through a center of the second central through hole 17b and being perpendicular to the longitudinal direction as well as the cross section of FIG. 1(a). The other end of these grooves 18a-18e is opened into the space 16 within the housing 14.

The housing 14 has formed therein first and second inlet openings 19a and 19b and first and second outlet openings 20a and 20b such that the first inlet and first outlet openings 19a and 20a are diametrically opposed to each other via the first valve portion 17a, and the second inlet and second outlet openings 19b and 20b are also diametrically opposed to each other via the second valve portion 13b. It should be noted that the first and second inlet openings 19a and 19b serve to apply pressures of a main conduit not shown at positions on respective sides of a stop mechanism such as an orifice arranged within the main conduit to the housing 14, and the first and second outlet openings 20a and 20b serve to apply pressures from the housing 14 to respective sides of a pressure sensitive member of a differential pressure signal generator not shown.

Cylindrical shape sleeves 21 are screwed into the first and second inlet openings 19a and 19b and the first and second outlet openings 20a and 20b such that peripheral portions of these sleeves 21 are slightly extruded into the space 16 within the housing 14 to form depressions. Between the first and second valve portions 13a and 13 and the sleeves 21 there are arranged ring-shaped sealing members 22 made of a synthetic resin such that the sealing members are firmly fitted in the depressions formed at the peripheral portions of the sleeves 21 and are brought into tightly contact with the outer surfaces of the valve portions 13a and 13b.

The above mentioned sealing members 22 are brought into contact with the surfaces of the first and second valve portions 13a and 13b to seal the first and second inlet and outlet openings 19a, 19b and 20a, 20b and the first and second central through holes 17a and 17b in an air tight or liquid tight manner. Therefore, the first and second inlet openings 19a and 19b and the first and second outlet openings 20a and 20b are communicated with the first and second central through holes 17a and 17b, respectively in an air tight or liquid tight manner.

To the first and second inlet openings 19a and 19b are connected first and second inlet side pressure guide pipes 24a and 24b, respectively by means of flanges 23a and 23b, respectively. Similarly, to the first and second outlet openings 20a and 20b are connected first and second outlet side pressure guide pipes 26a and 26b, respectively by means of flanges 25a and 25b, respectively. Although not shown in the drawings, at free ends of the pressure guide pipes 24a, 24b, 26a and 26b there are formed flanges corresponding to the flanges 23a, 23b, 25a and 25b, respectively and corresponding flanges are coupled with each other by means of a bolt and a nut. In this manner, pressures in the main conduit at positions on respective sides of the orifice arranged within the main conduit are applied to the valve unit 11, and these pressures are transferred via the valve unit 11 to respective sides of the pressure sensitive member of the differential pressure signal generator.

At one end of the shaft portion 12 there is provided a flange 27, and a screw thread 28 is formed in the other end of the shaft portion 12. By clamping a nut 29 on the screw thread 28, the shaft portion 12 is firmly secured to the housing 14 in the longitudinal direction. A lever 30 is secured to the one of the shaft portion 12, and by operating the lever 30 the shaft portion 12 can be rotated within the housing 14. O-rings 31 are provided between the shaft portion 12 and the housing 14, O-rings 32 are arranged between the sleeves 21 and the inlet and outlet openings 19a, 19b, 20a, 20b, and O-rings 35 are provided between the flanges 23a, 23b, 25a, 25b and the housing 14.

FIGS. 1(a)-1(c) show a first condition of the valve unit 11 in which the valve unit 11 is rotated into a first rotational position by operating the lever 30 such that the first central through hole 17a of the first valve portion 13a is aligned with the first inlet opening 19a and first outlet opening 20a and at the same time the second central through hole 17b of the second valve portion 13b is aligned with the second inlet opening 19b and second outlet opening 20b as shown in FIGS. 1(b) and 1(c).

Then, a pressure in the main conduit at an upstream position with respect to the orifice arranged within the main conduit is applied to one side of the pressure sensitive member of the differential pressure signal generator via the first inlet side pressure guide pipe 24a, first inlet opening 19a, first central through hole 17a of the first valve portion 13a, first outlet opening 20a and first outlet side pressure guide pipe 26a, and at the same time a pressure in the main conduit at a downstream position with respect to the orifice is applied to the other side of the pressure sensitive member of the differential pressure signal generator via the second inlet side pressure guide pipe 24b, second inlet opening 19b, second central through hole 17b of the second valve portion 13b, second outlet opening 20b and second outlet side pressure guide pipe 26b. That is to say, a differential pressure is applied to the pressure sensitive member of the differential pressure signal generator and the differential pressure signal generator generates a signal representing the differential pressure which is related to a flow rate of a fluid passing through the main conduit. It should be noted that in FIGS. 1(a)-1(b), the fluid having a lower pressure is denoted by course dots and the fluid having a higher pressure is denoted by dense dots.

FIGS. 2(a)-2(c) show a second condition, in which a pressure in the main conduit at one of the above mentioned upstream and downstream positions is applied to both sides of the pressure sensitive member of the differential pressure signal generator. This condition is obtained by rotating the lever 30 coupled to the shaft portion 12 of the valve unit 11 in the clockwise direction viewed from a right-hand side over about 60 degrees with respect to the position shown in FIGS. 1(a)-1(c). That is to say, the first and second grooves 18a and 18b of the first valve portion 13a are communicated with the first inlet side and first outlet side pressure guide pipes 24a and 26a, respectively, and at the same time the fourth groove 18d of the second valve portion 13b is communicated with the second outlet side pressure guide pipe 26b.

Then, the first inlet side pressure guide pipe 24a is communicated with the first and second outlet side pressure guide pipes 26a and 26b via the first, second and fourth grooves 18a, 18b and 18d and the inside space 16 of the housing 14. In this manner, a pressure within the main conduit at one of the upstream and downstream positions with respect to the orifice is applied to both sides of the pressure sensitive member of the differential pressure signal generator. In this second condition, the differential pressure signal generator may be safely used for the first time or may be safely used again after a rather long intermission.

FIGS. 3(a)-3(c) depict a third condition, in which the valve unit 11 is isolated from the pressure in the main conduit and no differential pressure is applied across the pressure sensitive member of the differential pressure signal generator. This third condition is attained by rotating the lever 30 coupled to the shaft portion 12 of the valve unit 11 in the counterclockwise direction viewed from a right-hand side over about 60 degrees with respect to the position shown in FIGS. 1(a)-1(c). Then, the third groove 18c of the first valve portion 13a is communicated with the first outlet side pressure guide pipe 26a, and at the same time the fifth groove 18e of the second valve portion 13b is communicated with the second outlet side pressure guide pipe 26b.

In the third condition, the first and second outlet side pressure guide pipes 26a and 26b are communicated with each other via the third and fifth grooves 18c and 18e and the inside space 16 of the housing 14. Therefore, pressures at respective sides of the pressure sensitive member of the differential pressure signal generator become identical with each other, and the zero point adjustment of the differential pressure signal generator can be performed.

In the three-valves manifold for a differential pressure type flow meter according to the invention, suitable click mechanism may be advantageously provided at the first, second and third rotational positions of the valve unit 11. Then the valve unit 11 can be rotated accurately into the first, second and third rotational positions.

The present invention is not limited to the above explained embodiment, but many modifications and alternations may be conceived by a person skilled in the art within the scope of the invention. For instance, in the above embodiment, the valve portions 13a, 13b are formed in a spherical shape, but they may be formed in a cylindrical shape having a circular cross section.

The invention claimed is:

1. A three-valves manifold for a differential pressure type flow meter comprising:
   a valve unit including a shaft portion and first and second valve portions provided on the shaft portion separated from each other along a longitudinal direction of the shaft portion, each of said first and second valve portions having a circular cross section; and
   a housing having a cylindrical space within which a part of said shaft portion and said first and second valve portions are rotatably installed, said housing having formed therein (i) first and second inlet openings which are communicable with a main conduit at upstream and downstream positions, respectively, with respect to an orifice arranged within the main conduit through which a fluid whose flow rate to be measured flows, and (ii) first and second outlet openings which are communicable with respective sides of a pressure sensitive member of a differential pressure signal generator, said first inlet and outlet openings being diametrically opposed to each other and said second inlet and outlet openings being diametrically opposed to each other;

wherein:

said first valve portion has a first central through hole formed within the first valve portion and first, second and third grooves formed in an outer surface of the first valve portion and said second valve portion has a second central through hole formed within the second valve portion and fourth and fifth grooves formed in an outer surface of the second valve portion, inner ends of said first to fifth grooves being opened to the cylindrical space of the housing;

said valve unit is rotatable into first, second and third rotational positions;

in said first rotational position, said first central through hole of the first valve portion is communicated with said first inlet and outlet openings and said second central through hole of the second valve portion is communicated with said second inlet and outlet openings;

in the second rotational position, said first and second grooves of the first valve portion are communicated with said first inlet and outlet openings, respectively, and at the same time said fourth groove of the second valve portion is communicated with said second outlet opening; and in said third rotational position, said third groove of the first valve portion is communicated with the first outlet opening and said fifth groove of the second valve portion is communicated with said second outlet opening.

2. The three-valves manifold for differential pressure type flow meter according to claim 1, wherein each of said first and second valve portions has a substantially spherical shape.

3. The three-valves manifold for differential pressure type flow meter according to claim 1, wherein sealing members are arranged at said first and second inlet and outlet openings such that the sealing members are brought into contact with the outer surfaces of the first and second valve portions.

4. The three-valves manifold for differential pressure type flow meter according to claim 1, wherein an operating member operable by a user is secured to said shaft portion.

5. The three-valves manifold for differential pressure type flow meter according to claim 1, wherein in said first rotational position, pressures in the main conduit at upstream and downstream positions with respect to the orifice are applied to respective sides of the pressure sensitive member of the differential pressure signal generator to measure a flow rate of the fluid passing through the main conduit, in said second rotational position, a pressure in the main conduit at one of said upstream and downstream positions is applied to both sides of the pressure sensitive member, and in said third rotational position, both sides of the pressure sensitive member are isolated from the main conduit and are communicated with each other.

* * * * *